Jan. 13, 1942.                    C. MOTT                    2,269,636
                          TORCH CUTTING MACHINE
                          Filed Feb. 24, 1941                2 Sheets-Sheet 1
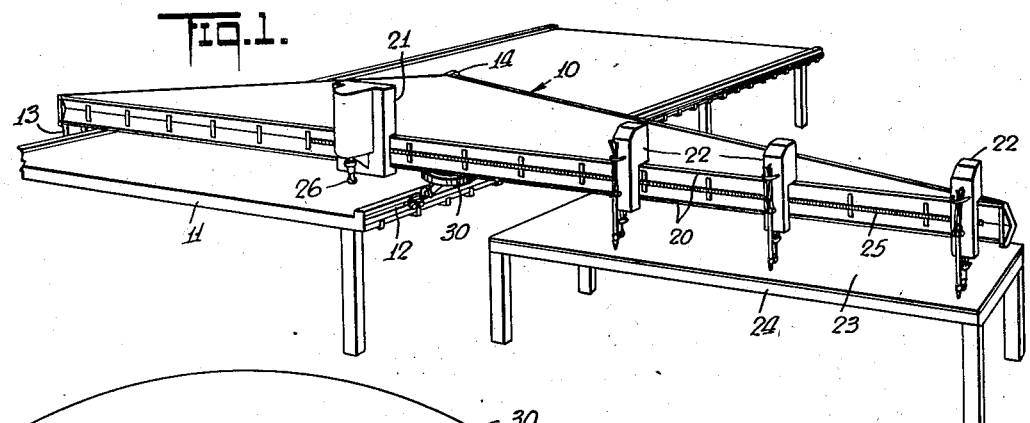
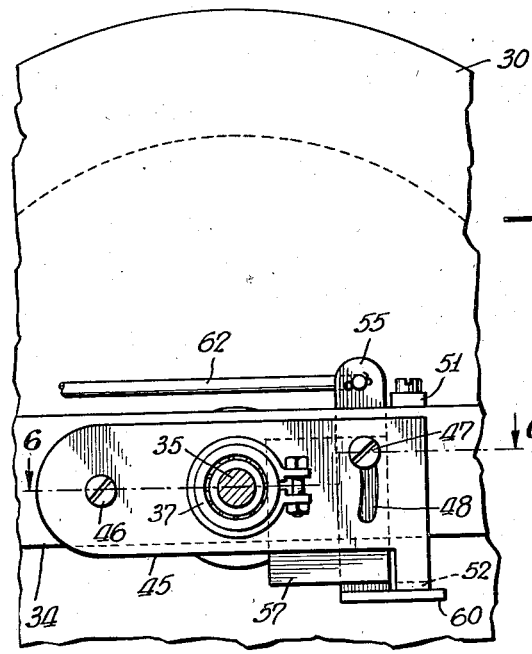
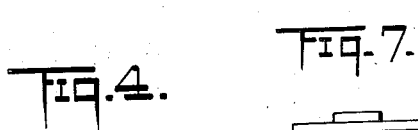
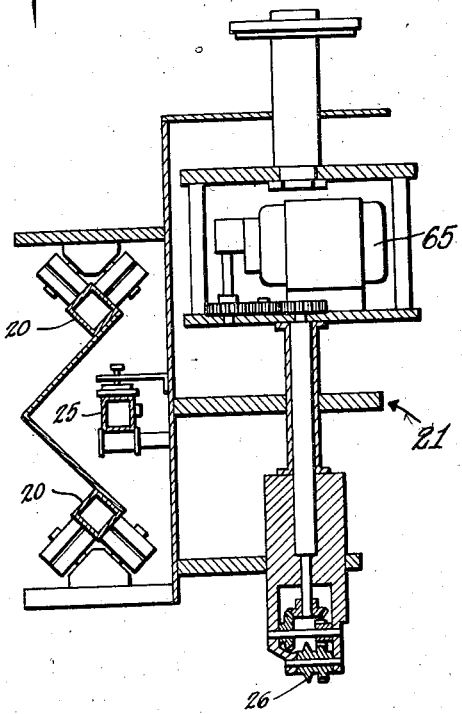
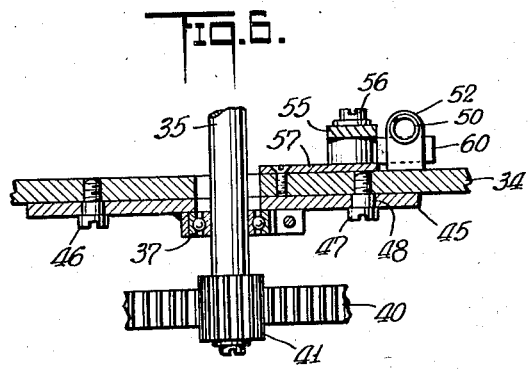
INVENTOR
Chester Mott
BY
Dean Fairbank & Hirsch
ATTORNEYS

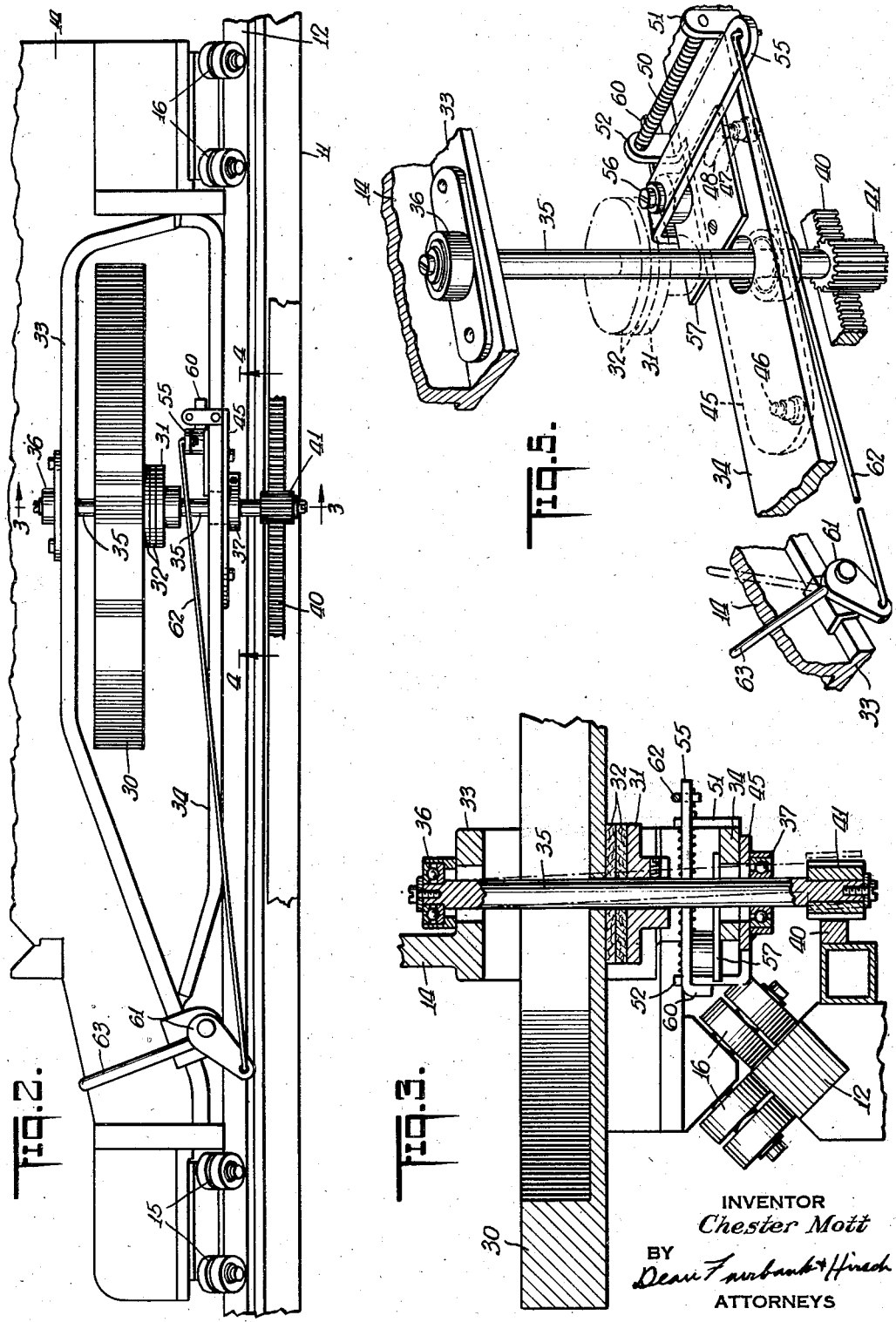

Patented Jan. 13, 1942

2,269,636

UNITED STATES PATENT OFFICE 2,269,636

TORCH CUTTING MACHINE

Chester Mott, Evanston, Ill., assignor to National Cylinder Gas Company, Chicago, Ill., a corporation of Delaware Application February 24, 1941, Serial No. 380,143

14 Claims. (Cl. 266—23)

The present invention relates to that general type of torch cutting machine, in which a carriage travels horizontally over a support for a templet, drawing, pattern or other guide, and carries both a tracing device for said guide and a cutting torch which may move in unison with the carriage and also along the carriage in a direction at right angles to the movement of the latter.

Since the cutting process is purely chemical, it requires precise relative quantities of oxygen and metal to effect good cuts. Variations in quantity of the metal to be cut (cutting speed) is therefore as serious as variations in oxygen pressure. It is therefore very important to maintain uniform velocity of the torch in cutting for a given oxygen flow, for this velocity is actually the rate at which the metal to be cut is presented to the oxygen stream.

The conventional traction drive of the carriage is by a milled wheel travelling over the guide. Between the point where the traction effort is developed and the torch, there are a number of guide wheels, rollers, or other mechanisms where lost motion and deflection may be occasioned. Lost motion amounting to 0.10 inch or more has been noted depending upon the state of repair of the machine and the tolerances to which the machine was built. The effect of this lost motion on the velocity of the carriage can be illustrated in a case of a force moving with uniform linear velocity and acting through a coil spring upon a mass which rolls through wheels upon a track. A jerky motion of the mass results due to the lost motion action of the spring and also due to the friction in the bearings of the wheels, and the rolling friction of the wheels on the track. A longer coil spring corresponding to increased lost motion will increase the range between the maximum and minimum velocities attained.

The heavy mass of the carriage adds to the difficulty of maintaining its speed uniform. This problem is not so important in the case of the torch in its movement along the carriage because of its relatively small mass.

Depending on the mass of the carriage, the amount of lost motion, nature of the rolling action and other factors, the carriage will travel with slight alternate accelerations and decelerations even though the propelling effort is constant.

One object of the present invention is to provide means for resisting accelerations or decelerations of a torch supporting carriage so as to maintain its velocity uniform.

Another object is to provide means for resisting accelerations or decelerations of a torch supporting carriage to maintain its velocity uniform while permitting instantaneous stopping and sudden reversal of said carriage.

A further object is to provide disengageable means whereby accelerations or decelerations of a torch supporting carriage are resisted to maintain its velocity uniform, and whereby upon disengagement of said means, said carriage may be moved free from the action of said means.

To attain these objects, a fly wheel supported on the carriage is driven by the movement of said carriage, and is arranged to resist sudden accelerations or decelerations thereof. A friction clutch is disposed in the drive to said fly wheel to permit slippage when starting the carriage or when it is desired to suddenly stop it and start it in an opposite direction. Means are provided for disengaging the drive to said fly wheel to permit the carriage to be moved at a higher rate free from the action of said fly wheel as, for instance, when it is desired to move the carriage to a different cutting position, or when it is desired to move the carriage to effect the placing or removal of a workpiece by an overhead crane.

Various other objects, features and advantages of the invention will be apparent from the following particular description and from an inspection of the accompanying drawings, in which Fig. 1 is a perspective view showing a torch cutting machine embodying the present invention.

Fig. 2 is a side elevation of a part of the machine of Fig. 1, but on a larger scale.

Figs. 3 and 4 are sections taken on lines 3—3 and 4—4 of Fig. 2 respectively, but on a larger scale.

Fig. 5 is a perspective view of the inertia control portion of the machine,

Fig. 6 is a section taken on lines 6—6 of Fig. 4, and Fig. 7 is a somewhat diagrammatic vertical section through the tracer unit and its support.

Referring to the drawings, the cutting apparatus may be of the well known type, or may be of the form shown and claimed in copending application Serial No. 378,102 and includes a carriage 10 which travels horizontally over a table 11 on which may be supported a templet, drawing, pattern or other guide. As the carriage projects beyond the table, one rail 12 which is fixed to the side of said table intermediate of the ends of the carriage 10 faces upwardly, while the other rail (not shown) is fixed to the other side of said table below the end of the carriage, and is engaged by upper and lower rollers (not shown) on a depending portion 13 of the carriage.

The carriage 10 has rigid therewith a truck frame 14 extending transversely of the main carriage frame and carrying two spaced sets of rollers 15 and 16 angularly mounted for rolling contact with the two angular traction faces of the rail 12, as shown in Figs. 2 and 3.

The carriage 10 is provided with a beam having parallel superposed rails 20 (Fig. 1) extending at right angles to the table rails for supporting a tracing mechanism 21, and one or more torch units 22 (three being shown) for movement in unison along said carriage in a horizontal direction at right angles to the direction of movement of said carriage. These torch units 22 travel over the plate 23 or other workpiece resting on a table 24 or other support to form duplicate cuts thereon and are secured to the tracing mechanism 21 by a bar 25 for movement therewith along the carriage 10.

The tracing mechanism 21 may be of the well known type or may be of the form shown and claimed in copending application Serial No. 395,616 and has a tracing element 26 in the form of a tracing wheel, pointer, spotlight or the like which is steered over the outline of the guide to be copied or traced. This tracing element 26 is driven by a motor 65 and may act as a traction wheel to move the carriage 10 and to move the torch units 22 along the carriage, or a traction wheel separate from the tracing element may be provided. The tracer unit as shown in Fig. 7 is supported by rollers engaging the rails 20 and it, as well as the torch units, is normally clamped to the bar 25 so that as the tracer unit moves along the rails 20 it will impart the same movement to the torch units.

In its broader aspects, the control mechanism for equalizing the speed of the carriage 10 comprises a fly wheel 30 carried by said carriage and rotatable by the movement thereof along its guide rails so that sudden and slight accelerations and decelerations of the carriage are resisted by the inertia of said fly wheel. A friction clutch 31, 32 in a drive to the fly wheel 30 permits slippage when the carriage 10 is started from rest or when said carriage is suddenly stopped and reversed.

The inertia control mechanism is desirably mounted on the carriage truck frame 14 which for that purpose is shown comprising a flange 33 along the bottom of its upstanding web, and a frame part 34 in the form of a flat bar spaced below said flange and rigid therewith. A vertical shaft 35 forming part of the transmission to the fly wheel 30 extends loosely through parallel sections of the frame parts 33 and 34 and is supported at its upper end in a thrust bearing 36 secured to the upper side of the flange 33.

A bearing 37 mounted on the frame part 34 in a manner to be described holds the intermediate section of the shaft 35 against transverse movement when said shaft is in operative drive position.

The drive between the carriage 10 and the shaft 35 comprises a fixed rack gear 40, extending parallel to the carriage rail 12 along the side of the table 11, and meshes with a pinion 41 affixed to said shaft so that as the carriage moves along its guide rails said pinion rolling over the rack gear 40 rotates said shaft.

The friction clutch between the shaft 35 and the fly wheel 30 includes a friction clutch plate 31 secured to the shaft 35, and a pair of superposed friction discs 32 loosely encircling said shaft and resting on said clutch plate. The fly wheel 30 loosely encircling the shaft 35 rests on the upper friction discs 32 so that as said shaft is rotated, the fly wheel is also rotated through the friction elements 31 and 32.

The disengagement of the drive to the fly wheel 30 is effected by the movement of the pinion 41 out of mesh with the rack gear 40. For that purpose the thrust bearing 36 permits a limited amount of angular play of the shaft 35, and the bearing 37 is horizontally movable to swing said shaft angularly about a point near said thrust bearing and away from the rack gear 40 into the dot and dash position shown in Fig. 3.

For moving the bearing 37 horizontally various means may be employed. The means shown includes a lever and toggle arrangement comprising a lever plate 45 rigidly carrying said bearing and pivotally secured near one end by a pin 46 to the underside of the frame part 34. Near the other end a pin 47 secured to the frame part 34 and extending into an arcuate slot 48 in the pivoted plate 45 limits angular movement of said plate, and at the same time cooperates with the pivot pin 46 in supporting said plate.

For normally urging the pinion 41 in mesh with the rack gear 40, a spring 50 has one end anchored in a bracket 51 fixed to one edge of the frame part 34, while the other end acts against a lug 52 forming part of the pivoted plate or lever 45. By means of this arrangement the lever 45 is angularly urged into limiting position shown in Figs. 4 and 5 with one end of its arcuate slot 48 engaging the pin 47. In this limiting position the pinion 41 will be in mesh with the rack gear 40 so that drive to the fly wheel 30 is established.

For angularly moving the lever 45 in position to disengage the pinion 41 from the rack gear 40 there is provided a bell crank lever 55, pivotally supported on the frame part 34 through a pivot pin 56 which is shown mounted on a base plate 57 secured to said frame part. An arm 60 of this lever 55 slidably engages the lug 52 to angularly move the lever 45 about its pivotal support 46.

For actuating the lever 55 a crank 61 pivotally supported on the frame flange 33 is connected to said lever by a rod 62 and is operated by a handle 63 rigid therewith. When the handle 63 is rotated from the position shown in full lines in Fig. 5 to throw-out position shown in dot and dash, the lever 55 is moved about its pivotal support 56 to cause its end portion 60 to push the lug 52 inwardly towards the frame part 34 against the action of the spring 50, and thereby causes angular movement of the lever 45 about its pivot support 46 from the limiting position shown in Figs. 4 and 5. Since the lever 45 carries the shaft bearing 37, this angular throw-out movement of said lever causes the shaft 35 to tilt away from the rack gear 40 about a point near the thrust bearing 36 to move the pinion 41 out of mesh with said rack gear. The pinion 41 is of relatively small pitch diameter so that very little tilting of the shaft 35 is necessary to disengage said pinion from the rack gear 40. In actual practice a pinion of about half an inch in pitch diameter has been found satisfactory. A little play in the bearing 37 permits the slight tilting of the shaft 35.

In throw-out position of the handle 63 shown in dot and dash lines in Fig. 5, the connecting rod 62 is almost in dead center position with respect to the crank 61 so that the pinion 41 will remain disengaged from the rack gear 40 without the necessity of holding said handle in said position.

When the drive to the fly wheel 30 is engaged, the movement of carriage 10 along its guide rails is transmitted to said fly wheel through the friction clutch 31, 32. The inertia of the fly wheel 30 resists slight alternate accelerations and decelerations of the carriage 10 and thereby causes said carriage to move at a steady speed. The clutch 31, 32 slips when force exceeding that necessary for correction is imposed, as, for instance, when the traction wheel on the tracing device is not riding on the guide, and the carriage is pushed rapidly by the operator from one position to another. This manual rapid movement of the carriage can be effected free from fly wheel resistance by disengagement of the drive to the fly wheel 30, as already described.

The clutch 31, 32 also slips when the carriage runs against an end stop or when a sharp corner is encountered in tracing.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

Having described my invention, what I claim as new and desire to secure by Letters Patent, is:

1. A torch cutting machine comprising a carriage movable along a predetermined path, a tracer and a cutting torch supported on and movable with said carriage and for movement in unison along the carriage in a direction at right angles to said path, a fixed rack gear extending parallel to the path of movement of said carriage, a fly wheel on said carriage, a transmission between said rack gear and said fly wheel for rotating said fly wheel by the movement of said carriage, a prime mover, and means independent of said fly wheel, gear and transmission for propelling said carriage.

2. In a torch cutting machine the combination comprising a torch supporting carriage, means for moving said carriage along a predetermined path, a fly wheel, and a drive including a slip clutch for rotating said fly wheel by the movement of said carriage, said fly wheel and drive being independent of said means.

3. In a torch cutting machine the combination comprising a torch supporting carriage, a track therefor, a fixed rack gear extending parallel to said track, a pinion carried by said carriage and meshing with said rack gear, a fly wheel, a transmission including a friction clutch between said pinion and said fly wheel for rotating said fly wheel, means independent of said fly wheel and clutch for moving said carriage along said track.

4. A torch cutting machine comprising a table for supporting a guide and having a pair of parallel rails, a carriage supported on and movable along said rails, a tracing device adapted to travel over said guide and supported on said carriage for movement therealong in a direction crosswise of said rails, a torch supported on said carriage and movable with said tracing device along said carriage, a fixed rack gear supported by said table parallel to said rails, a pinion carried by said carriage and meshing with said rack gear, a fly wheel, and a transmission between said pinion and said fly wheel for rotating said fly wheel as said carriage moves along said rails.

5. In a torch cutting machine the combination comprising a table having a pair of parallel rails along the sides thereof, a torch and tracer supporting carriage movable along said rails, a stationary rack gear extending parallel to said rails, a pinion carried by said carriage and meshing with said rack gear, a fly wheel, and a transmission between said pinion and said fly wheel for rotating said fly wheel as said carriage is moved along said rails.

6. In a torch cutting machine the combination comprising a tracer and torch supporting carriage, means for moving said carriage in respect to the work, a shaft supported on said carriage for movement therewith, means independent of said first mentioned means for rotating said shaft by the movement of said carriage, a friction clutch plate secured to said shaft for rotation therewith, and a fly wheel coaxial with and loosely encircling said shaft and supported on said clutch plate.

7. In a torch cutting machine the combination comprising a torch supporting carriage, a fly wheel, a drive between said carriage and said fly wheel for rotating said fly wheel by the movement of said carriage whereby acceleration and deceleration of said carriage are resisted, and means for disengaging said drive to permit the movement of said carriage free from the resistance of said fly wheel.

8. In a torch cutting machine the combination comprising a torch supporting carriage movable along a predetermined path, a fixed rack gear extending parallel to said path, a pinion supported on said carriage and meshing with said rack gear, a fly wheel having a drive connection from said pinion for rotating said fly wheel by the movement of said carriage, and means for moving said pinion out of mesh with said rack gear to disengage the drive to said fly wheel.

9. In a torch cutting machine the combination comprising a torch supporting carriage movable along a predetermined path, a fixed rack gear extending parallel to said path, a pinion supported on said carriage and meshing with said rack gear, a fly wheel having a drive connection from said pinion for rotating said fly wheel by the movement of said carriage, and means for angularly moving said pinion into or out of mesh with said rack gear at will.

10. In a torch cutting machine the combination comprising a torch supporting carriage movable along a predetermined path, a fly wheel, a drive for rotating said fly wheel by the movement of said carriage, and including a shaft and a pair of intermeshing gears, one of which is secured to said shaft, and means for tilting said shaft to move said gears relatively out of mesh to permit rapid movement of the carriage without change of speed of the fly wheel.

11. A torch cutting machine comprising a table having a pair of parallel rails, a carriage movable along said rails and having a section projecting beyond one side of said table, a tracer supported on said carriage and movable over said table in a direction crosswise of said rails, a torch supported on the projecting section of said carriage and movable therealong in unison with said tracer, said carriage including a truck intermediate of the ends thereof and having wheels riding over the rail nearest the projecting section of said carriage, a rack gear secured to the side of said table nearest said projecting carriage section and extending parallel to said rails, a shaft supported on said truck, a pinion on said shaft meshing with said rack gear, and a fly wheel supported on said truck and having a drive connection from said shaft.

12. A torch cutting machine of the type in which a torch and a motor driven dirigible traction wheel are mounted on a carriage for movement of the carriage by the traction wheel, and movement of the traction wheel and torch in unison along the carriage, said machine having a stationary rack bar and said carriage having a fly wheel, a pinion meshing with said rack bar and driving connections between said pinion and said fly wheel for rotating said fly wheel by the movement of said carriage and independent of the direction or speed of the movement of the torch and traction wheel along the carriage.

13. A torch cutting machine of the type in which a torch and a motor driven dirigible traction wheel are mounted on a carriage for movement of the carriage by the traction wheel, and movement of the traction wheel and torch in unison along the carriage, said machine having a stationary rack bar and said carriage having a fly wheel, a pinion meshing with said rack bar, slip friction driving connections between said pinion and said fly wheel, and means for moving the pinion out of mesh with the rack bar to permit movement of the carriage in the direction of the length of the rack bar, independent of controlling action by said fly wheel.

14. A torch cutting machine of the type in which a torch and a motor driven dirigible traction wheel are mounted on a carriage for movement of the carriage by the traction wheel, and movement of the traction wheel and torch in unison along the carriage, said machine having a stationary rack bar, a fly wheel mounted on said carriage, and power transmitting connections between said rack bar and said fly wheel and independent of said traction wheel for rotating the fly wheel during bodily movement of the carriage in the direction of the length of the rack bar, said connections including a slip friction drive, and means for at will preventing transmission of power to the fly wheel during said movement of the carriage by said traction wheel.

CHESTER MOTT.